J. ATKOCAITIS.
AUTOMOBILE HORN.
APPLICATION FILED MAR. 27, 1920.

1,433,593.

Patented Oct. 31, 1922.
2 SHEETS—SHEET 1.

INVENTOR
Juczapas Atkocaitis
BY
George C. Herrick
ATTORNEY

J. ATKOCAITIS.
AUTOMOBILE HORN.
APPLICATION FILED MAR. 27, 1920.

1,433,593.

Patented Oct. 31, 1922.
2 SHEETS—SHEET 2.

INVENTOR
Jucapas Atkocaitis
BY
George C. Heinrich
ATTORNEY

Patented Oct. 31, 1922.

1,433,593

UNITED STATES PATENT OFFICE.

JUCZAPAS ATKOCAITIS, OF CHICAGO, ILLINOIS.

AUTOMOBILE HORN.

Application filed March 27, 1920. Serial No. 369,225.

*To all whom it may concern:*

Be it known that I, JUCZAPAS ATKOCAITIS, a citizen of Lithuania, residing at Chicago, county of Cook, and State of Illinois, have invented certain new and useful Improvements in an Automobile Horn, of which the following is a specification.

This invention relates to automobile horns and more particularly to horns of the Klaxon type and it has for an object to provide a novel and improved means for vibrating the diaphragm of the horn.

More specifically speaking the invention has for an object to provide a simple and inexpensive construction whereby the horn may be operated by the flywheel of the automobile motor.

For further comprehension of the invention, and of the objects and advantages thereof, reference will be had to the following description and accompanying drawings, and to the appended claim in which the various novel features of the invention are more particularly set forth.

Figure 1 of the drawings is a perspective view of an automobile horn with its operating means constructed according to the invention.

Figure 1:
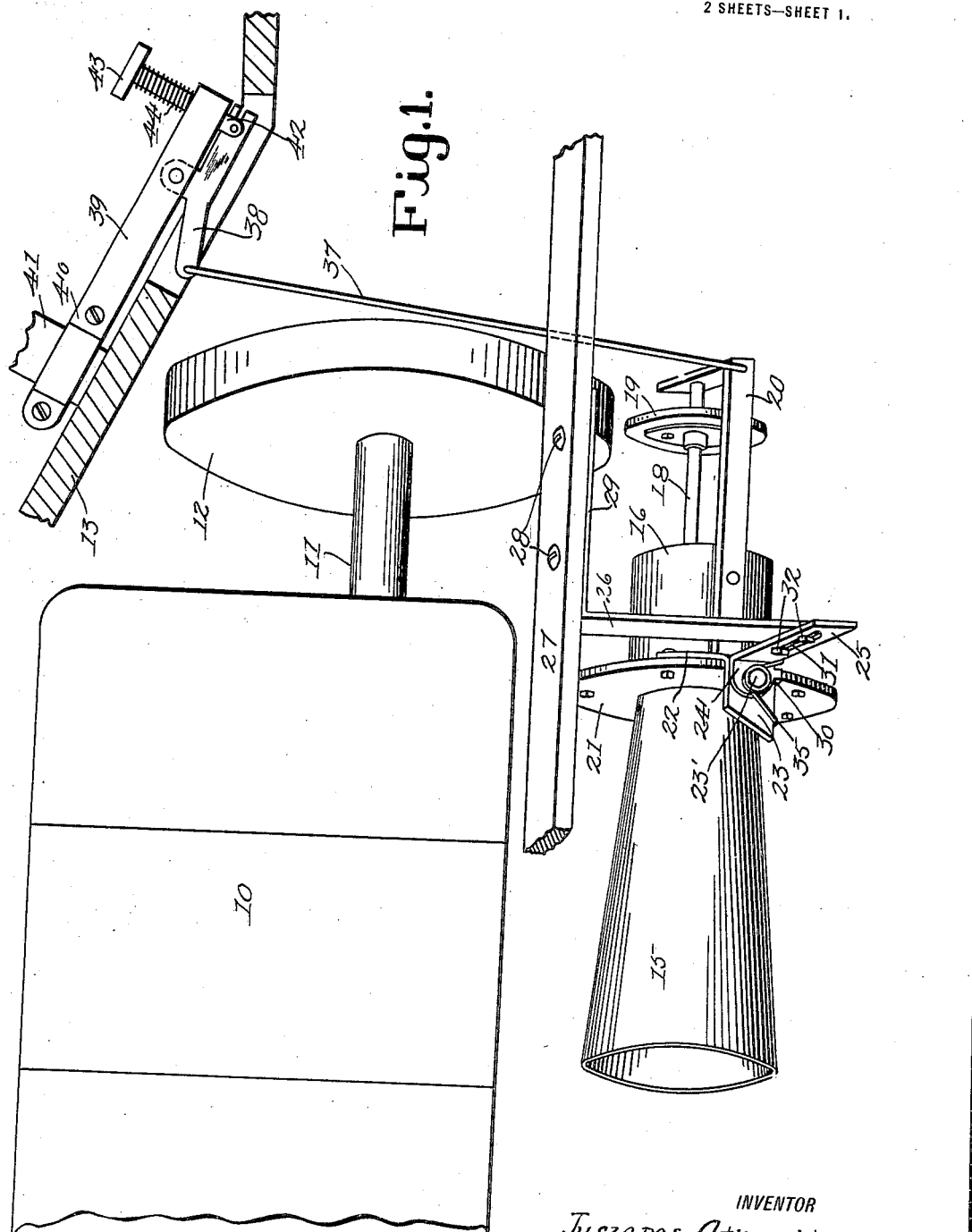
Figure 2:
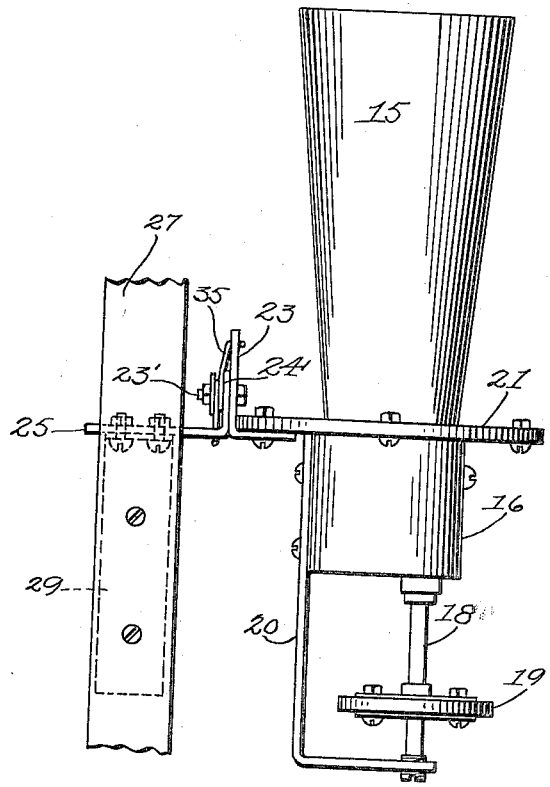
Figure 2 is a plan view thereof.
Figure 3:
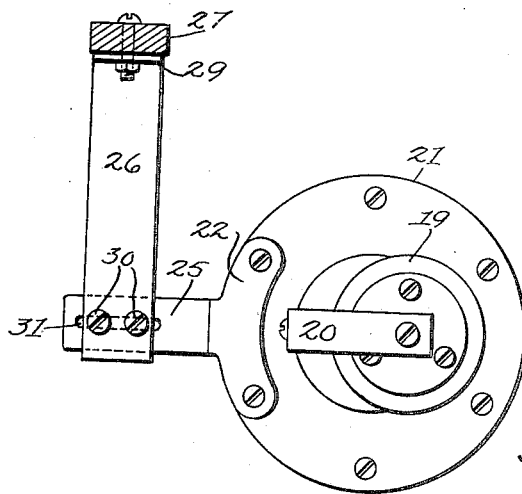
Figure 3 is an end view showing the supporting bar in transverse section.

In the drawings 10 indicates the engine of an automobile, 11 the engine shaft, and 12 the fly wheel; 13 indicating the foot board of the automobile, these parts being of usual construction, the invention being applicable to any type of automobile. The horn is shown at and may be of any well known type adapted to have its diaphragm vibrated by a suitable member carried on a rotary shaft which projects rearwardly from the mechanism body 16 of the horn. This shaft is indicated at 18 in the drawings and has fixed thereon a friction disk 19, while its rear end may be suitably supported in an angular arm 20 fixed on the side of the horn body 16 and extending rearwardly therefrom.

The horn is provided with a radial flange 21 at the front end of the mechanism body and to this flange is fixed a segmental bracket 22 having an axially extended foot 23 whereby it is pivotally connected as at 23' to a foot 24 on an arm 25 mounted in the lower end of a strap 26 which depends from a suitable fixed part as the bar 27 to which it is secured by screws 28 passing through the bar and screwed into a horizontal extension 29 on the upper end of the strap. The arm 25 may be secured to the strap 26 by means of bolts 30 passing through the strap and a slot 31 in the arm and having nuts 32 on their ends.

As will be apparent the horn is mounted in a manner to swing in a vertical plane around a transverse axis. The horn is normally urged in a direction to depress its rear end by a spring 35 coiled around the pivot pin and having an end engaging under the foot on the bracket 22 and the other end engaging under the arm 25, movement of the horn in this direction being limited by a lug 36 on the foot 24 engaging under the foot 23.

The horn is positioned so as to have the disk 19 in juxtaposition to the rim of the flywheel 12 and normally the periphery of the disk is spaced slightly below the periphery of the flywheel. The horn is swung on the pivot pin 23' to move the disk 19 against the flywheel by means of a link 37 connected at one end to the arm 20 and at its opposite end to one end of a lever 38 fulcrumed between its end to a bar 39 secured by a split clamp 40 of well known type to the steering post 41. The opposite end of the lever 38 is engaged by a plunger 42 carried in the bar 39 and having a foot pedal 43 on its upper end, a spring 44 normally pressing the pedal upward.

Having thus described my invention what I claim as new and desire to secure by Letters Patent of the United States, is as follows—

A means for operating an automobile horn by bringing it into contact with the fly wheel of the automobile engine consisting of a radial flange on said horn, a segmental bracket fixed to said flange, a foot axially extending from said bracket, a fixed part, a strap depending from said fixed part, an arm adjustably mounted in the lower end of said strap to which said foot is pivotally connected, a spring coiled around the pivot pin of said foot for normally depressing the rear end of said horn, a lug connected with said arm and engaging said foot for limiting the movement of said horn in one direction, a disc on the horn operating shaft in juxtaposition to the fly wheel of the automobile engine, an angular arm fixed to the side of said horn, a link connected to said arm, a bell crank lever, a foot operated, spring controlled pedal secured to one arm of said bell crank lever and a link secured to the other arm of said bell crank lever and to said angular arm for swinging said disc into engagement with the fly wheel of the engine upon the depression of said foot lever for sounding the horn.

In testimony whereof I have affixed my signature.

JUCZAPAS ATKOCAITIS.